US009927629B2

(12) United States Patent
Leng

(10) Patent No.: US 9,927,629 B2
(45) Date of Patent: Mar. 27, 2018

(54) DISPLAY APPARATUS AND DISPLAY SYSTEM

(71) Applicant: BOE TECHNOLOGY GROUP CO., LTD., Beijing (CN)

(72) Inventor: Changlin Leng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/122,158

(22) PCT Filed: Jul. 28, 2015

(86) PCT No.: PCT/CN2015/085280
§ 371 (c)(1),
(2) Date: Aug. 26, 2016

(87) PCT Pub. No.: WO2016/150055
PCT Pub. Date: Sep. 29, 2016

(65) Prior Publication Data
US 2017/0017090 A1   Jan. 19, 2017

(30) Foreign Application Priority Data

Mar. 20, 2015 (CN) .......................... 2015 1 0124388

(51) Int. Cl.
*G02F 1/1335* (2006.01)
*G02B 27/28* (2006.01)
(Continued)

(52) U.S. Cl.
CPC .......... *G02B 27/288* (2013.01); *G02C 7/105* (2013.01); *G02C 7/12* (2013.01); *G02F 1/1323* (2013.01); *G02F 1/1335* (2013.01); *G02F 1/133514* (2013.01); *G02F 1/133528* (2013.01); *G09F 9/35* (2013.01); *G02F 2001/133562* (2013.01);
(Continued)

(58) Field of Classification Search
None
See application file for complete search history.

(56) References Cited

U.S. PATENT DOCUMENTS 5,033,829 A * 7/1991 Faroughy ................. E06B 9/24
359/486.03
5,488,496 A * 1/1996 Pine .................. G02F 1/133308
349/58

(Continued)

FOREIGN PATENT DOCUMENTS

CN 101055329 A 10/2007
CN 102523470 A 6/2012
(Continued)

OTHER PUBLICATIONS

International Search Report and Written Opinion from PCT Application Serial No. PCT/US2015/085280, dated Dec. 28, 2015, 12 pages.

*Primary Examiner* — James Dudek
(74) *Attorney, Agent, or Firm* — Kinney & Lange, P.A.

(57) ABSTRACT

A display apparatus includes: a display panel comprising a plurality of first sub-pixels for a first field of view and a plurality of second sub-pixels for a second field of view; and a first polarization filter having blank regions corresponding to the first sub-pixels or the second sub-pixels. The blank regions have no light polarization property.

14 Claims, 3 Drawing Sheets

(51) Int. Cl.
*G02C 7/12* (2006.01)
*G09F 9/35* (2006.01)
*G02C 7/10* (2006.01)
*G02F 1/13* (2006.01)

(52) U.S. Cl.
CPC ............ *G02F 2001/133567* (2013.01); *G02F 2203/07* (2013.01)

(56) References Cited

U.S. PATENT DOCUMENTS

| | | | |
|---|---|---|---|
| 9,594,273 B2* | 3/2017 | Li | G02F 1/133528 |
| 2007/0070004 A1* | 3/2007 | Yabuta | G02F 1/1323 |
| | | | 345/87 |
| 2008/0259232 A1* | 10/2008 | Kim | G02F 1/133528 |
| | | | 349/15 |
| 2016/0048055 A1* | 2/2016 | Dong | G02F 1/133528 |
| | | | 349/1 |

FOREIGN PATENT DOCUMENTS

| CN | 102854626 A | 1/2013 |
|---|---|---|
| CN | 103235441 A | 8/2013 |
| CN | 104658434 A | 5/2015 |
| WO | WO2009/134269 A1 | 11/2009 |

* cited by examiner

DISPLAY APPARATUS AND DISPLAY SYSTEM

CROSS-REFERENCE TO RELATED APPLICATIONS

This application is a Section 371 National Stage Application of International Application No. PCT/CN2015/085280, filed on 28 Jul. 2015, entitled "DISPLAY APPARATUS AND DISPLAY SYSTEM", which has not yet published, which claims priority to Chinese Application No. 201510124388.0, filed on 20 Mar. 2015, incorporated herein by reference in their entirety.

BACKGROUND

1. Technical Field

Embodiments of the present invention relate to the field of display technology, and particularly to a display apparatus and a display system.

2. Description of the Related Art

When a user uses a conventional electronic apparatus, any person can see contents displayed on a screen of the electronic apparatus so that user's data in the electronic apparatus is leaked.

SUMMARY

In accordance with embodiments of the present invention, there is provided a display apparatus comprising: a display panel comprising a plurality of first sub-pixels for a first field of view and a plurality of second sub-pixels for a second field of view; and a first polarization filter having blank regions corresponding to the first sub-pixels or the second sub-pixels, the blank regions having no light polarization property.

In accordance with embodiments of the present invention, the first polarization filter is disposed on a light output side of the display panel.

In accordance with embodiments of the present invention, the display apparatus further comprises: a backlight source disposed on a light input side of the display panel; and a second polarization filter disposed between the backlight source and the display panel, wherein the first polarization filter is disposed on a light output side of the display panel.

In accordance with embodiments of the present invention, the display panel comprises a color filter substrate, an array substrate, and a liquid crystal layer disposed between the color filter substrate and the array substrate.

In accordance with embodiments of the present invention, the first polarization filter has a left-handed polarity and the second polarization filter has a right-handed polarity; or the second polarization filter has a left-handed polarity and the first polarization filter has a right-handed polarity.

In accordance with embodiments of the present invention, there is provided a display system comprising the abovementioned display apparatus.

In accordance with embodiments of the present invention, the display system further comprises polarization glasses having the same light polarization property as the first polarization filter.

In accordance with embodiments of the present invention, the display system further comprises polarization glasses having the same light polarization property as the first polarization filter.

In the embodiments of the present invention, there is provided a display apparatus. The display apparatus comprises: a display panel, a dual-view barrier, a first polarization filter, a second polarization filter and a backlight source which are arranged in sequence. The display panel comprises: a plurality of first sub-pixels, a plurality of second sub-pixels adjacent to the plurality of first sub-pixels, and a black matrix disposed between adjacent ones of the sub-pixels. A positional relation among the display panel, the dual-view barrier, the first polarization filter, the second polarization filter and the backlight source satisfies the following relation: $\tan\theta = [H*(B+P)]/[H^2+A*(A+B+P)]$, where H is a distance between the dual-view barrier and a light emitting point of the display panel, P is a width of a single sub-pixel, B is a width of the black matrix between two adjacent sub-pixels, A is a distance between an edge of a light transmission region of the dual-view barrier and an edge of the black matrix, and $\theta$ is a maximal included angle where a viewer can see only an image formed by the first sub-pixels or the second sub-pixels.

In an embodiment of the present invention, the dual-view barrier is a parallax grating.

In an embodiment of the present invention, the dual-view barrier has a prism structure.

In an embodiment of the present invention, the first polarization filter has a left-handed polarity and the second polarization filter has a right-handed polarity; or the second polarization filter has a left-handed polarity and the first polarization filter has a right-handed polarity.

In an embodiment of the present invention, regions of the first polarization filter corresponding to the first sub-pixels or the second sub-pixels are blank regions or have no light polarization property.

Embodiments of the present invention further provide a display system comprising the abovementioned display apparatus.

In embodiments of the present invention, the display system further comprises polarization glasses having the same light polarization property as the first polarization filter.

DETAILED DESCRIPTION OF THE EMBODIMENTS

Figure 1:
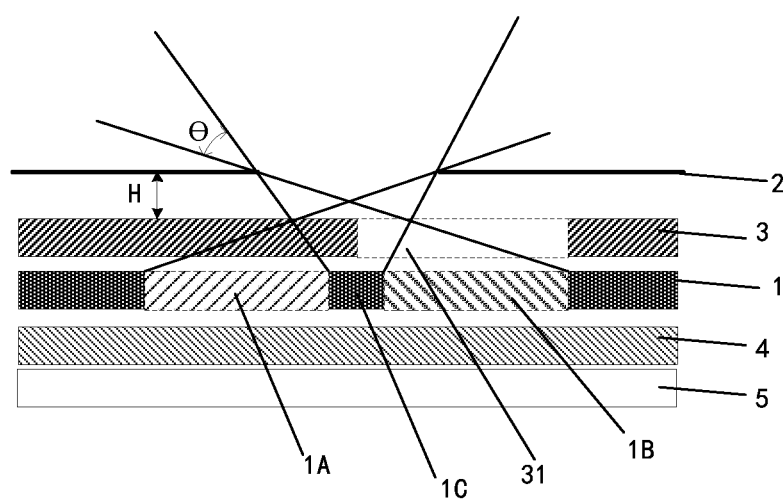
FIG. 1 is a schematic diagram of a display apparatus according to an embodiment of the present invention.

A further description of the invention will be made in detail as below with reference to embodiments of the present invention taken in conjunction with the accompanying drawings. The following embodiments are intended to explain the present invention and the present invention should not be construed as being limited to the embodiment set forth herein.

According to a general inventive concept of embodiments of the present invention, there is provided a display apparatus. The display apparatus comprises: a display panel, a dual-view barrier, a first polarization filter, a second polarization filter and a backlight source which are arranged in sequence. Light emitted from the backlight source is outputted after being passed through the second polarization filter, the display panel, the first polarization filter and the dual-view barrier. The display panel comprises: a plurality of first sub-pixels, a plurality of second sub-pixels adjacent to the plurality of first sub-pixels, and a black matrix disposed between adjacent ones of the sub-pixels. A positional relation among the display panel, the dual-view barrier, the first polarization filter, the second polarization filter and the backlight source satisfies the following relation: $\tan\theta=[H*(B+P)]/[H^2+A*(A+B+P)]$, where H is a distance between the dual-view barrier and a light emitting point of the display panel, P is a width of a single sub-pixel, B is a width of the black matrix between two adjacent sub-pixels, A is a distance between an edge of a light transmission region of the dual-view barrier and an edge of the black matrix, and θ is a maximal included angle where a viewer can see only an image formed by the first sub-pixels or the second sub-pixels. Thereby, different viewers can see only different pictures displayed on the same dual-view display apparatus so as to achieve a privacy display of information and data.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to embodiments of the present invention, there is provided a display apparatus. As shown in FIG. 1, the display apparatus comprises: a display panel 1 comprising a plurality of first sub-pixels 1A for a first field of view and a plurality of second sub-pixels 1B for a second field of view; and a first polarization filter 3 having blank regions 31 corresponding to the second sub-pixels 1B. The blank regions 31 have no light polarization property. The first polarization filter 3 may be disposed on a light output side of the display panel.

According to embodiments of the present invention, as shown in FIG. 1, the display apparatus further comprises: a backlight source 5 disposed on a light input side of the display panel 1; and a second polarization filter 4 disposed between the backlight source 5 and the display panel 1. The first polarization filter 3 is disposed on a light output side of the display panel 1. The display panel 1 may comprise a color filter substrate, an array substrate, and a liquid crystal layer disposed between the color filter substrate and the array substrate.

The display panel 1 may comprise any appropriate display panels, for example, a self-luminous display panel such as an organic light-emitting diode display device and a display panel that needs a backlight source.

According to an example of the present invention, referring to FIG. 1, the display apparatus comprises: a display panel 1, a dual-view barrier 2, a first polarization filter 3, a second polarization filter 4 and a backlight source 5. Light emitted from the backlight source 5 is outputted after being passed through the second polarization filter 4, the display panel 1, the first polarization filter 3 and the dual-view barrier 2. The display panel 1 comprises: first sub-pixels 1A, second sub-pixels 1B, and a black matrix 1C disposed between adjacent ones of the sub-pixels.

Figure 2:
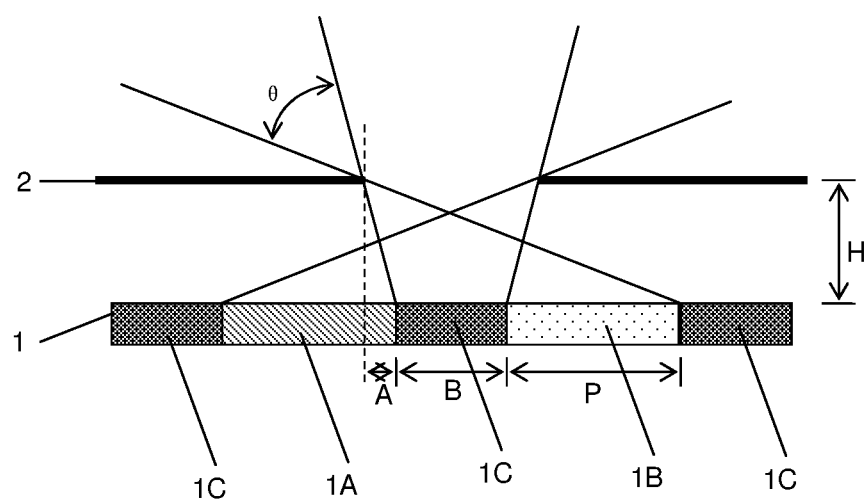
FIG. 2 is a schematic diagram showing a positional relation between a dual-view barrier and other components of the display apparatus according to the embodiment of the present invention.

FIG. 2 is a schematic diagram of a positional relation among components of the display device according to the embodiment of the present invention. As shown in FIG. 2, θ is a maximal included angle where a viewer can see only an image formed by the first sub-pixels or the second sub-pixels, i.e., an angle of a single field of view. This angle of a single field of view means a range of the field of view where a viewer can see only an image formed by the first sub-pixels or the second sub-pixels. A positional relation among the display panel, the dual-view barrier, the first polarization filter, the second polarization filter and the backlight source satisfies the following relation:

$\tan\theta=[H*(B+P)]/[H^2+A*(A+B+P)]$, where H is a distance between the dual-view barrier and a light emitting point of the display panel, P is a width of a single sub-pixel, B is a width of the black matrix between two adjacent sub-pixels, and A is a distance between an edge of a light transmission region of the dual-view barrier and an edge of the black matrix.

Figure 3:
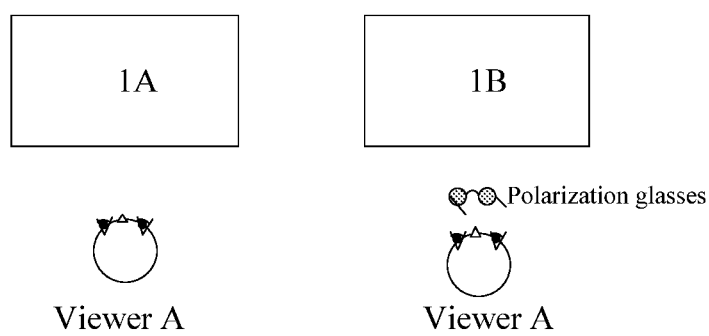
FIG. 3 is a schematic diagram showing a viewing effect of a display system and a display apparatus according to an embodiment of the present invention.

With the display apparatus according to the embodiment of the present invention, if a viewer is in a naked-eye state, as shown in FIGS. 1 and 3, he/she can see only an image formed by the first sub-pixels 1A, but cannot see an image formed by the second sub-pixels 1B; and when a viewer wears polarization glasses having the same light polarization property as the first polarization filter 3 of the display apparatus or polarization glasses matching the second polarization filter 4 of the display apparatus, he/she can see only an image formed by the second sub-pixels 1B, but cannot see an image formed by the first sub-pixels 1A. Therefore, a privacy display of information and data is achieved.

Here, the polarization glasses having the same light polarization property as the first polarization filter of the display apparatus means that the polarization glasses have a left-handed polarity if the first polarization filter has a left-handed polarity, and the polarization glasses have a right-handed polarity if the first polarization filter has a right-handed polarity.

Referring to FIGS. 1 and 2 again, in the display apparatus according to the embodiment of the present invention, the dual-view barrier 2 is disposed on the first polarization filter 3. A center line of an opening of the dual-view barrier coincides with a center line of the first sub-pixel 1A and the second sub-pixel 1B adjacent to each other and regarded as a whole. Within a range of the angle θ of a single field of view, a viewer can see only an image formed by the first sub-pixels 1A or the second sub-pixels 1B.

In an embodiment of the present invention, the second polarization filter has blank regions only corresponding to the second sub-pixels 1B, or has regions only corresponding to the second sub-pixels 1B and having no light polarization property. Those skilled in the art could modify the embodiments of the present invention. For example, the first polarization filter has blank regions only corresponding to the first sub-pixels 1A, or has regions only corresponding to the first sub-pixels 1A and having no light polarization property; in another example, the light polarization property of the first polarization filter or the second polarization filter is changed, which falls within the scope of the present invention.

As shown in FIG. 3, with a display system and the display apparatus according to an embodiment of the present invention, if a viewer is in a naked-eye state, from an angle of a single field of view, he/she can see only an image formed by the first sub-pixels 1A, but cannot see an image formed by the second sub-pixels 1B; and when a viewer wears polarization glasses having the same light polarization property as the first polarization filter, he/she can see only an image formed by the second sub-pixels 1B, but cannot see an image formed by the first sub-pixels 1A. Therefore, a privacy display of information and data is achieved.

In an embodiment of the present invention, the dual-view barrier is a parallax grating. When a width of an opening of the dual-view barrier is equal to B+2A, the angle θ is an angle of a single field of view. Thereby, different viewers can see only different pictures displayed on the same display screen so as to achieve a privacy display of information and data.

In an embodiment of the present invention, the dual-view barrier has a prism structure. When each prism covers two sub-pixels, individual fields of view may have the same angle by refraction of the prism. Thereby, different viewers can see only different pictures displayed on the same display screen so as to achieve a privacy display of information and data.

The dual-view barrier is not limited to the above features. Those skilled in the art may adopt other structures or components instead of a parallax barrier.

In an embodiment of the present invention, the first polarization filter has a left-handed polarity and the second polarization filter has a right-handed polarity; or the second polarization filter has a left-handed polarity and the first polarization filter has a right-handed polarity. If the first polarization filter has a left-handed polarity, the polarization glasses of the display system according to the embodiment of the present invention are configured to have a left-handed polarity. If the first polarization filter has a right-handed polarity, the polarization glasses of the display system according to the embodiment of the present invention are configured to have a right-handed polarity.

As shown in FIG. 1 or 2, in an embodiment of the present invention, regions of the first polarization filter corresponding to the first sub-pixels or the second sub-pixels are blank regions or have no light polarization property.

With the display apparatus and the display system according to the embodiment of the present invention, different viewers can see only different pictures displayed on the same display apparatus so as to achieve a privacy display of information and data. The display apparatus and the display system are applicable to a privacy display in military affairs, business and the like.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A display apparatus comprising:
    a dual-view barrier;
    a display panel comprising a plurality of first sub-pixels configured for a first field of view, a plurality of second sub-pixels configured for a second field of view and respectively positioned adjacent to the plurality of first sub-pixels, and a black matrix disposed between adjacent ones of the first and second sub-pixels; and
    a first polarization filter having blank regions corresponding to the first sub-pixels or the second sub-pixels, the blank regions having no light polarization property, wherein:
    the first polarization filter is disposed on a light output side of the display panel; and
    a positional relation among the display panel, the dual-view barrier, and the first polarization filter satisfies the following relation $\tan \theta = [H^*(B+P)]/[H^2 + A^*(A+B+P)]$, where H is a distance between the dual-view barrier and a light emitting point of the display panel, P is a width of a single sub-pixel, B is a width of the black matrix between two adjacent sub-pixels, A is a distance between an edge of a light transmission region of the dual-view barrier and an edge of the black matrix, and θ is a maximal angle where a viewer can see only an image formed by the first sub-pixels or the second sub-pixels.

2. The display apparatus of claim 1, further comprising:
    a backlight source disposed on a light input side of the display panel; and
    a second polarization filter disposed between the backlight source and the display panel,
    wherein the first polarization filter is disposed on a light output side of the display panel.

3. The display apparatus of claim 2, wherein:
    the display panel comprises a color filter substrate, an array substrate, and a liquid crystal layer disposed between the color filter substrate and the array substrate.

4. The display apparatus of claim 2, wherein:
    the first polarization filter has a left-handed polarity and the second polarization filter has a right-handed polarity; or
    the second polarization filter has a left-handed polarity and the first polarization filter has a right-handed polarity.

5. A display system, comprising:
    the display apparatus of claim 1.

6. The display system of claim 5, further comprising:
    polarization glasses having the same light polarization property as the first polarization filter.

7. A display system, comprising:
    the display apparatus of claim 2.

8. The display system of claim 7, further comprising:
    polarization glasses having the same light polarization property as the first polarization filter.

9. A display system, comprising:
    the display apparatus of claim 3.

10. The display system of claim 9, further comprising:
    polarization glasses having the same light polarization property as the first polarization filter.

11. A display system comprising:
    the display apparatus of claim 4.

12. The display system of claim 11, further comprising:
    polarization glasses having the same light polarization property as the first polarization filter.

13. The display apparatus of claim 1, wherein:
    the dual-view barrier is a parallax grating.

14. The display apparatus of claim 1, wherein:
    the dual-view barrier has a prism structure.

* * * * *